US012410650B2

(12) United States Patent
Lalkota

(10) Patent No.: US 12,410,650 B2
(45) Date of Patent: Sep. 9, 2025

(54) SWING DOOR OPERATOR

(71) Applicant: Overhead Door Corporation, Lewisville, TX (US)

(72) Inventor: Goutham R. Lalkota, Corpus Christi, TX (US)

(73) Assignee: Overhead Door Corporation, Lewisville, TX (US)

( * ) Notice: Subject to any disclaimer, the term of this patent is extended or adjusted under 35 U.S.C. 154(b) by 285 days.

(21) Appl. No.: 17/681,233

(22) Filed: Feb. 25, 2022

(65) Prior Publication Data

US 2023/0272661 A1 Aug. 31, 2023

(51) Int. Cl.
*E05F 15/63* (2015.01)
*E05F 1/10* (2006.01)
*E05F 15/53* (2015.01)

(52) U.S. Cl.
CPC .............. *E05F 15/63* (2015.01); *E05F 1/105* (2013.01); *E05F 15/53* (2015.01); *E05F 2015/631* (2015.01); *E05Y 2201/11* (2013.01); *E05Y 2201/499* (2024.05); *E05Y 2600/56* (2013.01); *E05Y 2800/70* (2013.01); *E05Y 2900/132* (2013.01)

(58) Field of Classification Search
CPC ........... E05F 2015/631; E05Y 2201/11; E05Y 2201/492; E05Y 2201/702; E05Y 2201/224; E05Y 2201/638; E05Y 2201/682; E05Y 2201/688; E05Y 2201/70; E05Y 2600/56; E05Y 2600/12; E05Y 2800/70; E05Y 2800/174; E05Y 2800/296
USPC .................. 49/340, 341, 342, 344, 345, 346
See application file for complete search history.

(56) References Cited

U.S. PATENT DOCUMENTS 3,864,875 A 2/1975 Hewitt
4,234,996 A * 11/1980 Jentsch .................. E05F 3/223 16/62
4,263,694 A * 4/1981 Jentsch .................. A62C 2/12 16/62
4,501,090 A 2/1985 Yoshida et al.
4,580,365 A * 4/1986 Sieg ........................ E05F 15/63 16/49
4,660,250 A * 4/1987 Tillman .................. E05F 1/006 16/DIG. 9
5,187,835 A * 2/1993 Lee ........................ E05F 3/102 16/58

(Continued)

FOREIGN PATENT DOCUMENTS

AT 266645 11/1968
CN 106014051 A 10/2016

(Continued)

OTHER PUBLICATIONS

The Hague, Extended European Search Report and Opinion, Jun. 23, 2023.

*Primary Examiner* — David E Sosnowski
(74) *Attorney, Agent, or Firm* — Haynes and Boone, LLP

(57) ABSTRACT

A door operator including an output shaft, a ball screw, a powered driver, and a yoke. The output shaft is configured to be coupled to a door. The powered driver is operatively coupled to the ball screw and configured to rotate the ball screw in a first rotational direction. The yoke is coupled to the ball screw and configured to translate in response to rotation of the ball screw. The yoke is configured to rotate the output shaft.

19 Claims, 10 Drawing Sheets

(56) References Cited

U.S. PATENT DOCUMENTS

| | | | | |
|---|---|---|---|---|
| 5,259,090 | A * | 11/1993 | Fayngersh | E05F 3/12 16/62 |
| 5,488,896 | A | 2/1996 | Current | |
| 5,513,467 | A * | 5/1996 | Current | E05F 15/63 49/340 |
| 5,687,507 | A * | 11/1997 | Beran | E05F 15/63 74/89.37 |
| 6,151,753 | A * | 11/2000 | Salutzki | E05F 3/10 16/49 |
| 6,223,469 | B1 * | 5/2001 | Moll | E05F 15/611 49/339 |
| 7,401,759 | B2 | 7/2008 | Alfieri | |
| 7,966,771 | B2 * | 6/2011 | Bienek | E05F 3/223 60/473 |
| 8,393,054 | B2 | 3/2013 | Bienek | |
| 8,613,126 | B2 * | 12/2013 | Blockley | E05F 3/102 16/56 |
| 8,966,712 | B1 * | 3/2015 | Yu | E05F 3/02 16/69 |
| 11,168,504 | B2 * | 11/2021 | Eickhoff | E05F 3/22 |
| 2007/0022664 | A1 * | 2/2007 | Mahonen | E05F 15/63 49/342 |
| 2016/0002965 | A1 | 1/2016 | Janak | |
| 2017/0081892 | A1 | 3/2017 | Fan | |
| 2021/0230924 | A1 | 7/2021 | Romero | |
| 2023/0272661 | A1 * | 8/2023 | Lalkota | E05F 15/622 49/334 |

FOREIGN PATENT DOCUMENTS

| | | | | |
|---|---|---|---|---|
| CN | 106703586 | A | 5/2017 | |
| DE | 1759958 | B1 | 12/1971 | |
| DE | 102014212351 | A1 | 12/2015 | |
| DE | 102015202830 | B3 * | 8/2016 | E05F 15/63 |
| EP | 2305936 | A2 | 4/2011 | |
| EP | 3696359 | A1 | 8/2020 | |
| EP | 4279696 | A1 * | 11/2023 | E05F 15/53 |
| WO | 2020020866 | A1 | 1/2020 | |
| WO | 2020201110 | A1 | 10/2020 | |

* cited by examiner

SWING DOOR OPERATOR

TECHNICAL FIELD

This disclosure is generally directed to an operator for a door, specifically, a swing door. In some examples, a ball screw driven by a motor moves a yoke which causes rotation of an output shaft to open the door and also compresses biasing springs configured to return the door to a closed position.

BACKGROUND

Various operators for automatically opening and/or closing doors are known, particularly with respect to swing doors which swing open by pivoting around hinges mounted to a door frame. Some operators may use an electric motor, for example, to both open and close the door by rotating a spindle which is connected to an arm that is, in turn, connected to the door. Rotating the spindle causes displacement of the arm which causes the door to transition between open and closed conditions. Some operators use a motor for opening the door and use a non-powered mechanism for closing the door such as a spring which biases the door toward the closed position.

Some known door operators may include a large number of moving parts including gears, spindles, levers, and other components. During use, some of these components may be subjected to backlash due to design tolerances and other considerations. Backlash may lead to a considerable error in positioning within the components and, in turn, the door.

Some door operators may be configured for a specific installation orientation. That is, some door operators are limited to use as a left-hand operator or a right-hand operator and the appropriate operator must be selected for a given door configuration. In this regard, a left-hand operator may be unsuitable for use in a right-hand setup and vice versa.

A need accordingly exists for a swing door operator that addresses one or more shortcomings of conventional swing door operators.

SUMMARY

The present disclosure is directed to a swing door operator that may address one or more of the challenges found in conventional swing door operators. Some implementations may include a ball screw that is driven by a motor to open the door and is driven by springs to close the door.

According to some examples, the present disclosure is directed to a door operator that may include an output shaft, a ball screw, a powered driver, and a yoke. The output shaft may be configured to be coupled to a door. The powered driver may be operatively coupled to the ball screw and configured to rotate the ball screw in a first rotational direction. The yoke may be coupled to the ball screw and configured to translate in response to rotation of the ball screw. The yoke may be configured to rotate the output shaft.

In some examples, a door operator may include a cam assembly coupled to the yoke. The cam assembly may be configured to rotate about a rotation axis of the output shaft during translation of the yoke. The rotation axis of the output shaft may be substantially transverse to a rotation axis of the ball screw. A yoke may include an elongated slot having a longitudinal axis oriented transverse to the rotation axis of the ball screw. A cam assembly may extend into the elongated slot. A cam assembly may include a guide member configured to roll along a surface defining the elongated slot during translation of the yoke. A door operator may include a directional block to prevent the guide member from crossing the longitudinal axis of the door operator.

In some examples, a door operator may include at least one pin oriented transverse to a longitudinal axis of the ball screw. The at least one pin may be configured to extend through at least one slot in the yoke. The at least one slot in the yoke may be oriented parallel to the longitudinal axis of the ball screw.

In some examples, a barrier operator may include at least one spring configured to rotate the ball screw in a second rotational direction opposite the first rotational direction. A ball screw nut may be disposed about the ball screw and coupled to the yoke. The ball screw nut may be configured to pull the yoke in a first linear direction when the ball screw is rotated in the first rotational direction and to push the yoke in a second linear direction when the ball screw is rotated in the second rotational direction. At least one rod may extend longitudinally within each spring of the at least one spring. The yoke may include at least one rod recess configured to receive an end of the at least one rod as the yoke is translated. The yoke may be configured to compress the at least one spring as the yoke translates in response to rotation of the ball screw in the first rotational direction. The at least one spring may be configured to expand and push the yoke causing rotation of the ball screw in the second rotational direction.

In some examples, a door operator has a first installation configuration in which operation of the powered driver causes rotation of the output shaft in a third rotational direction and a second installation configuration in which operation of the powered driver causes rotation of the output shaft in a fourth rotational direction opposite the third rotational direction.

According to some examples, the present disclosure is directed to a system including a door and a door operator. The door operator may include an output shaft, a ball screw, a powered driver, and a yoke. The output shaft may be configured to be coupled to the door. The powered driver may be operatively coupled to the ball screw and configured to rotate the ball screw in a first rotational direction. The yoke may be coupled to the ball screw and configured to translate in response to rotation of the ball screw. The yoke may be configured to rotate the output shaft.

In some examples, the door operator may include at least one spring configured to rotate the ball screw in a second rotational direction opposite the first rotational direction.

In some examples, a system may include one or more of a swing arm coupling the door operator and the door, a frame hingedly coupled to the door and supporting the door operator, a track mounted to the door and slidably supporting an end of the swing arm, a bracket mounted to the door and pivotally supporting an end of the swing arm, or an actuator configured to trigger actuation of the powered driver.

According to some examples, the present disclosure is directed to a method for operating a door operator. The method may include rotating a ball screw in a first rotational direction with a powered driver operatively coupled to the ball screw, translating a yoke coupled to the ball screw using the rotation of the ball screw, and rotating an output shaft using the translation of the yoke, the output shaft couplable to a door.

In some examples, a method may include compressing, during the translation of the yoke, the at least one spring, and rotating the ball screw in a second rotational direction, opposite the first rotational direction, by expanding the at least one spring. Rotating the output shaft using the translation of the yoke may include rotating a cam assembly engaged with the yoke. The cam assembly may include the output shaft.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any embodiment or aspect may be combinable with one or more features of other embodiment or aspect.

BRIEF DESCRIPTION OF THE DRAWINGS

The accompanying drawings illustrate implementations of the systems, devices, and methods disclosed herein and together with the description, serve to explain the principles of the present disclosure.

Figure 1:
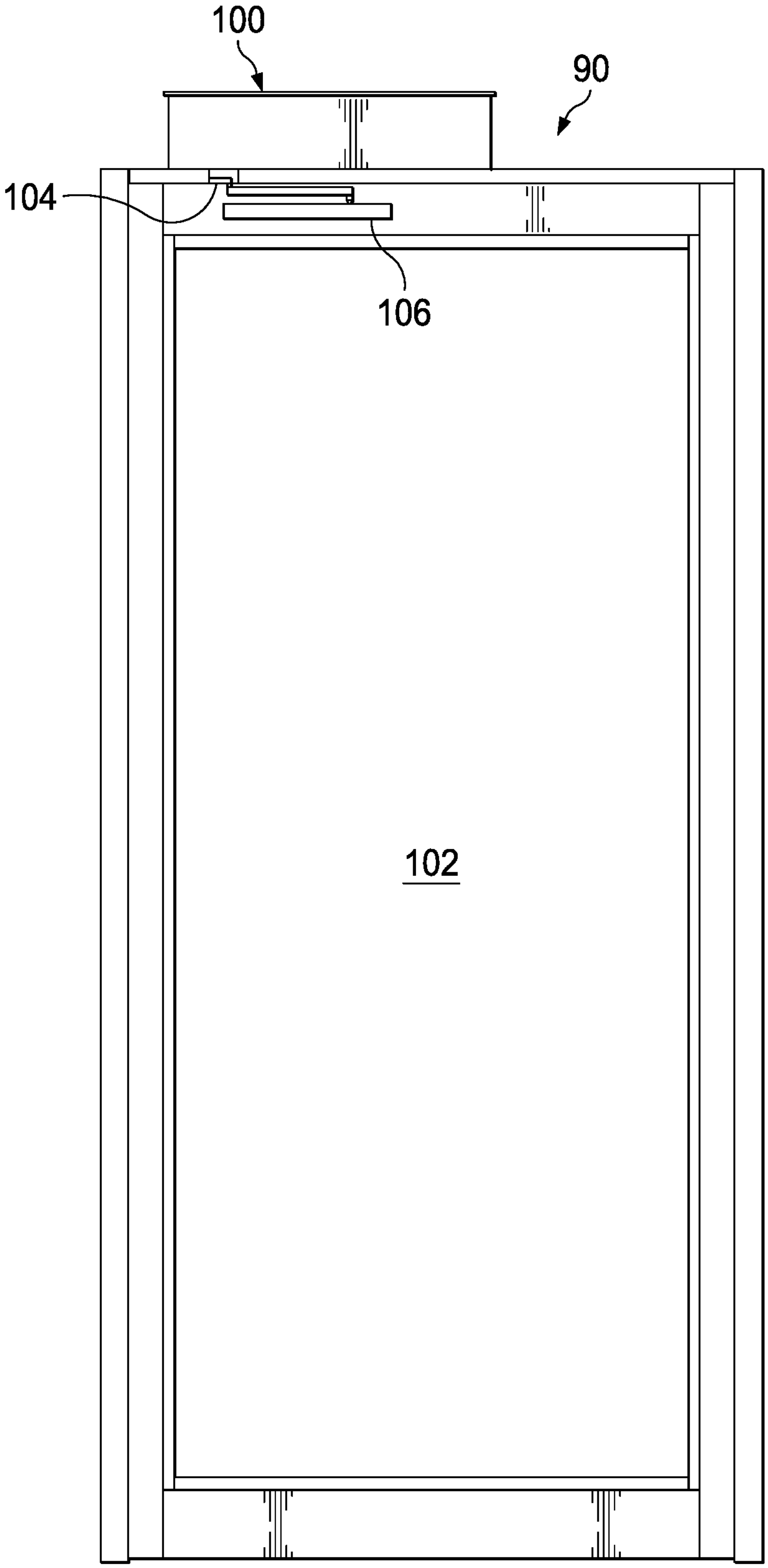
FIG. 1 is a front view of an embodiment of a system including a door operator according to an example implementation of the present disclosure.

These Figures will be better understood by reference to the following Detailed Description.

DETAILED DESCRIPTION

For the purpose of promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or Figures, when those same elements or features appear in subsequent Figures, without such a high level of detail. It is fully contemplated that the features, components, and/or steps described with respect to one or more implementations or Figures may be combined with the features, components, and/or steps described with respect to other implementations or Figures of the present disclosure. For simplicity, in some instances the same or similar reference numbers are used throughout the drawings to refer to the same or like parts.

The present disclosure is directed to a swing door operator that may include a motorized ball screw driving rotation of a cam and, in turn, an output shaft. Motor driven movement of the ball screw also compresses one or more springs that reverse movement of the operator components upon stopping of the motor. A door operator of the present disclosure may be easily transitioned from a right-hand unit to a left-hand unit by adjustment and/or repositioning of one or more components, and in some implementations, may have little or no backlash.

Figure 2:
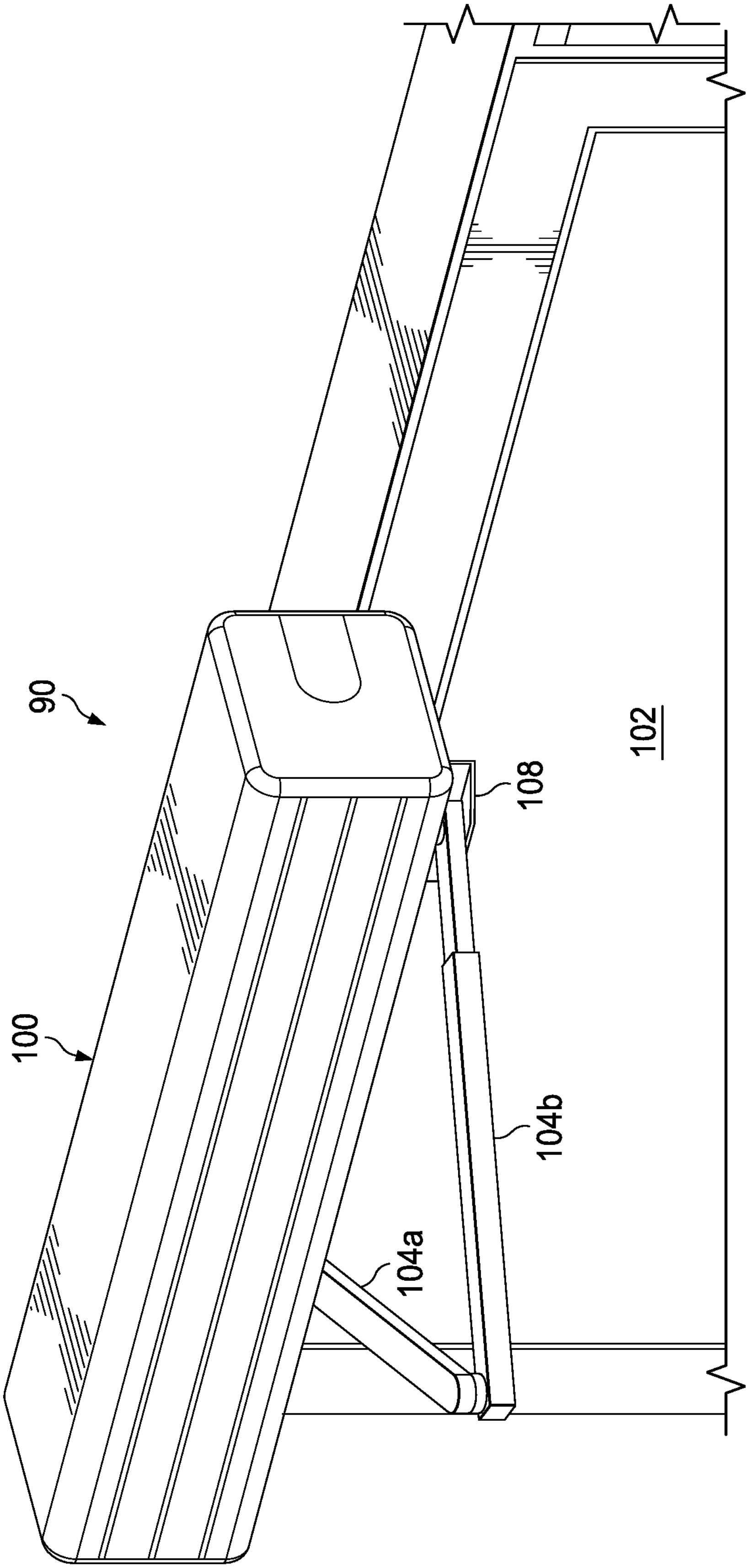
FIG. 2 is a perspective view of a portion of the system of FIG. 1.
Figure 3:
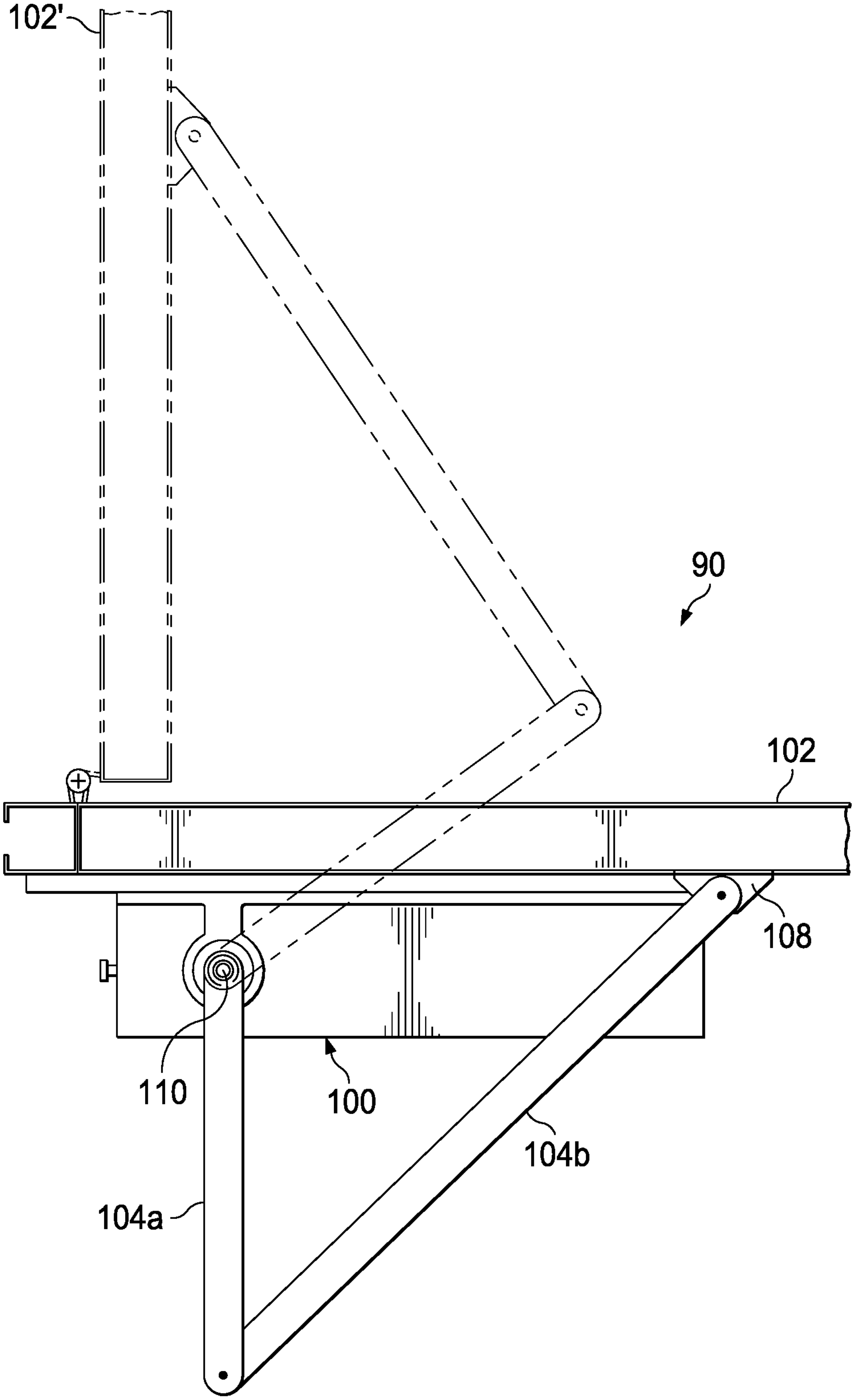
FIG. 3 is a bottom view of the system of FIG. 1, showing the door in an open configuration in dashed lines and a closed configuration in solid lines.

FIGS. 1-3 illustrate an embodiment of a system 90 which includes a swing door operator 100 and a door 102 according to the present disclosure. Door operator 100 is typically mounted above the door 102. For example, it may be mounted to the door frame, to a header above the door frame, to a wall above the door frame, or even within a wall. It is also contemplated that a door operator may be positioned along a side of or adjacent to a door. A swing arm assembly 104 may form a part of the door operator 100 or may be configured to cooperate with the door operator 100. Swing arm assembly 104 is attached to the door operator 100 at one end and is attached to the door 102 at the other end. Depending on the implementation, the swing arm assembly 104 may include a single member or link or may be comprised of a plurality of members or links. In the embodiment illustrated in FIG. 1, the swing arm assembly 104 is attached to the door 102 via a track 106. The track 106 also may form a part of the door operator 100 or may be separate from the door operator 100. An end of the swing arm assembly 104 may slide along the track 106 as the door 102 opens and closes.

In FIG. 2, it can be seen that swing arm assembly 104 in this implementation comprises first arm member **104*a* and second arm member 104*b* which are pivotally connected at a joint. In this illustration, second arm member 104*b* is attached to the door 102 via a bracket 108, in lieu of a track, and pivots with respect thereto as the door 102 opens and closes. The swing arm assembly 104 connects to the door operator 100 at a spindle 110 as shown in FIG. 3**.

FIG. 3 illustrates how the first arm member **104*a* and second arm member 104*b* of the swing arm assembly 104 interact to transition from a closed configuration of the door 102 to an open configuration of the door 102' as it pivots about a hinge and as spindle 110 rotates the first arm member 104*a***.

Figure 4:
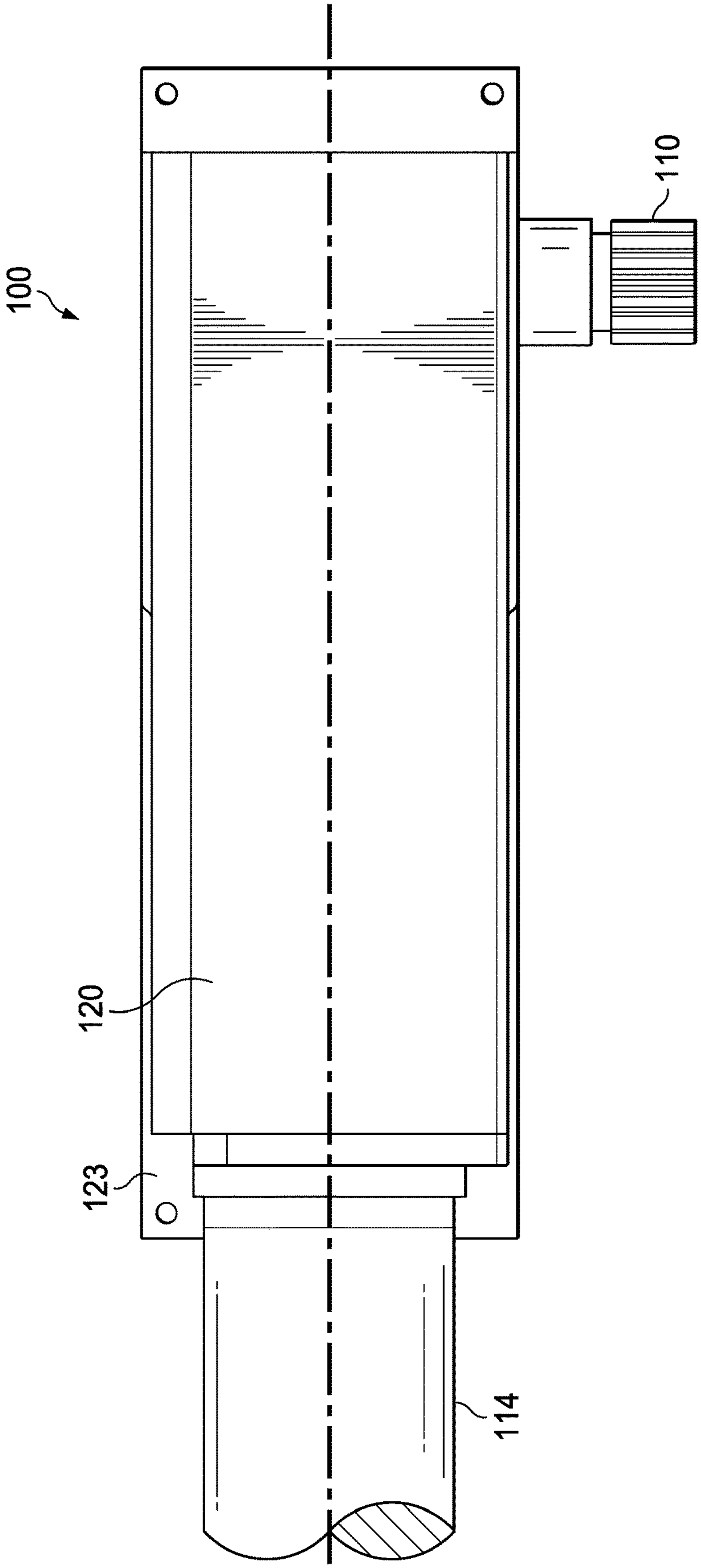
FIG. 4 is a side view of an embodiment of a door operator according to an example implementation of the present disclosure.

FIGS. 4-11 illustrate an embodiment of a door operator 100 according to the present disclosure. As shown in FIG. 4, spindle 110 may have a notched or toothed surface that interfaces with a corresponding surface of first arm member **104*a*. Alternatively, first arm member 104*a* may be permanently attached to spindle 110 or may be screwed or otherwise fastened thereto. A housing cover 120 may enclose a space housing internal components of the door operator 100. The housing cover 120 may improve an aesthetic appearance of the door operator 100 and prevent injury that may otherwise be caused by the movement of the internal components. A motor 114 may be secured to a side or end of the door operator 100. The motor 114 may be disposed in any orientation or arrangement which facilitates powering the door operator 100. Although illustrated and described as an electric motor, motor 114 may comprise any suitable mechanism for powering the drive unit 128 of the door operator 100, such as a pneumatic or hydraulic piston. In this regard, the motor 114 may be referred to herein as a "driver" or "powered driver" which encompasses any suitable means for driving operation of the door operator 100. In the illustrated example, the motor 114 extends outside the housing cover 120. However, the motor 114 may be concealed within the housing cover 120 in some examples. Housing cover 120 may be secured to the door operator 100 with any suitable fastener or latch or, in some examples, may be snap fit to a primary bracket 123 or other component of the door operator 100**.

Figure 5:
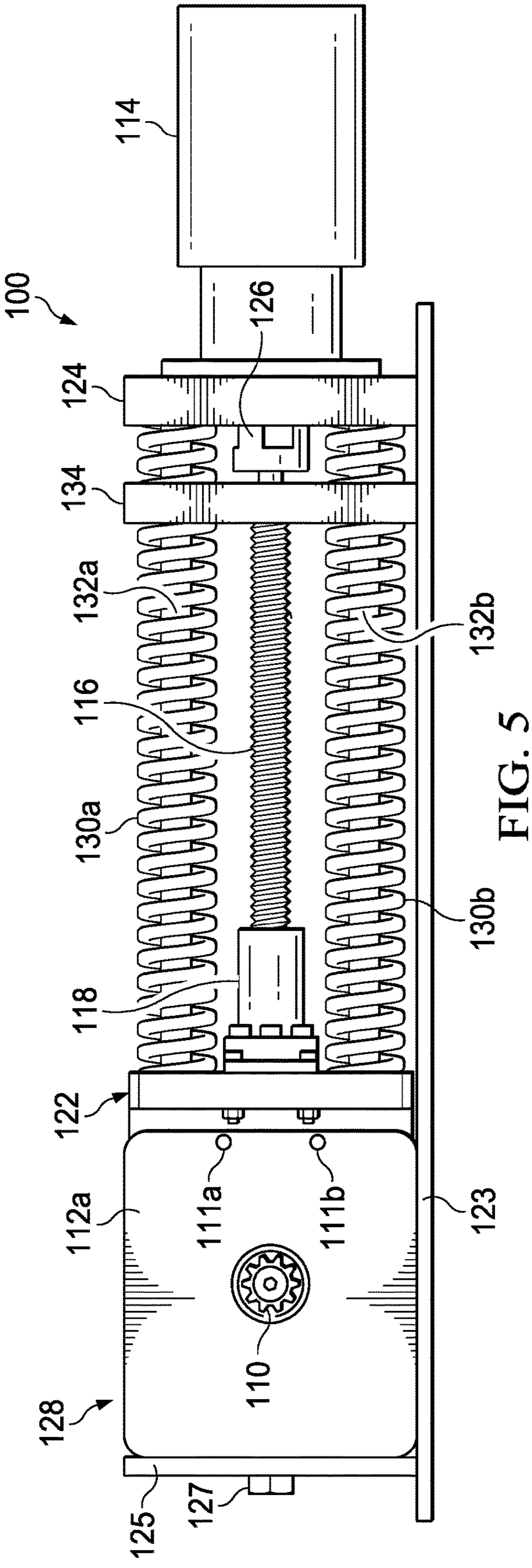
FIG. 5 is a bottom view of the door operator of FIG. 4 in a closed-door configuration with the housing cover removed.
Figure 6:
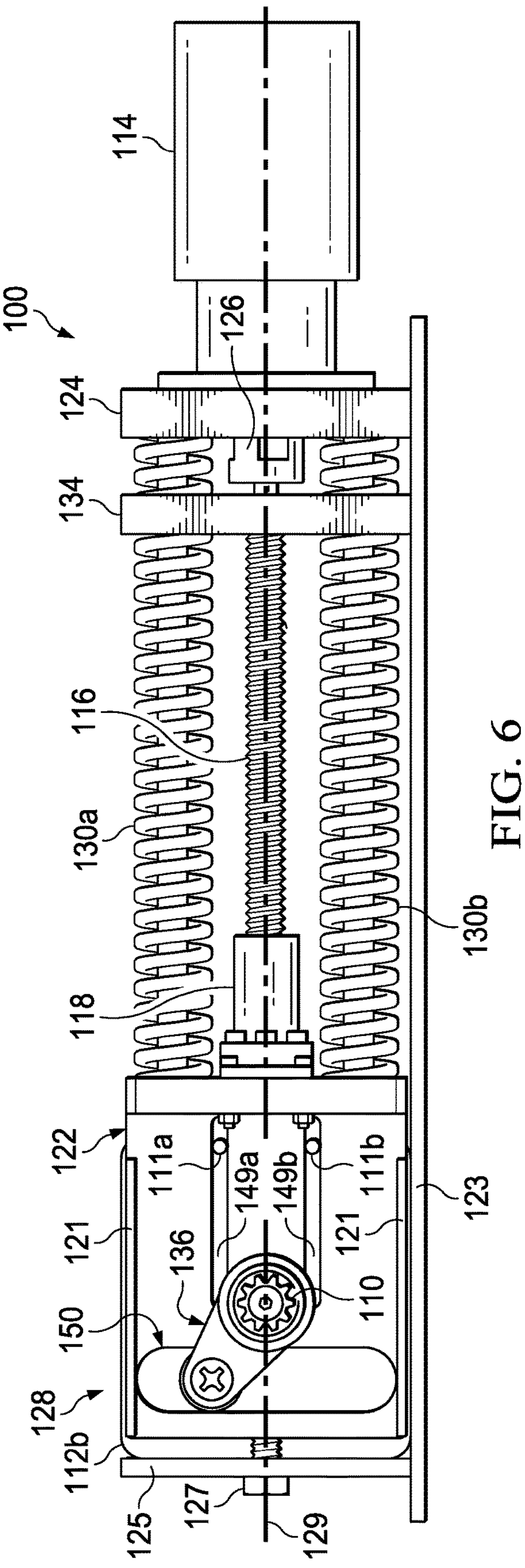
FIG. 6 is a bottom view of the door operator of FIG. 5 with a cover plate removed.
Figure 7:
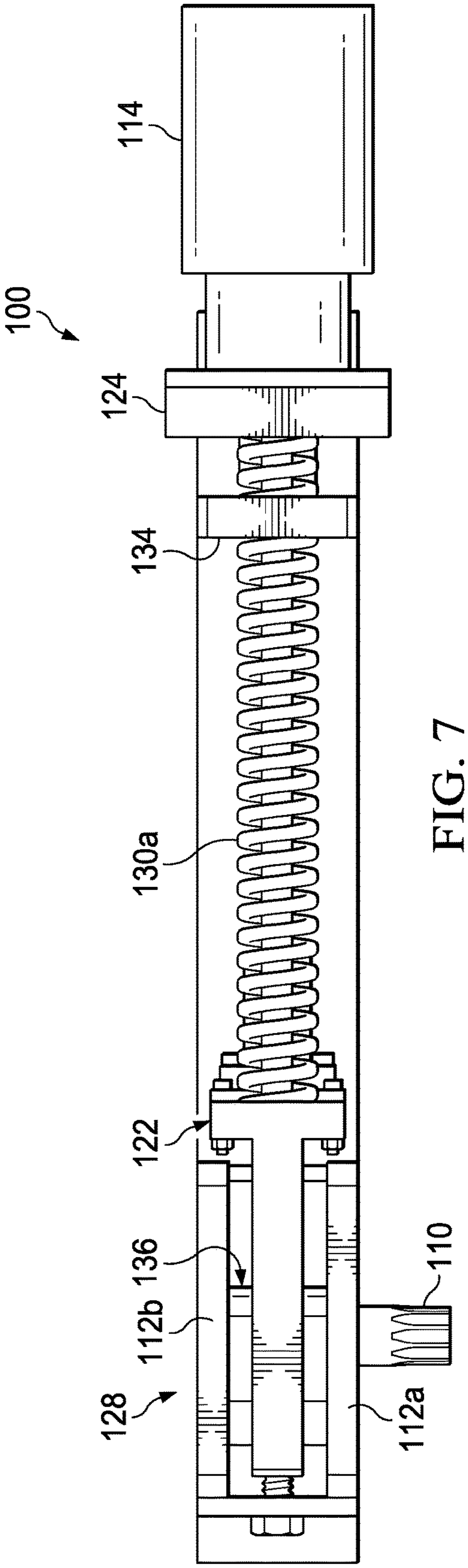
FIG. 7 is a side view of the door operator of FIG. 5.
Figure 8:
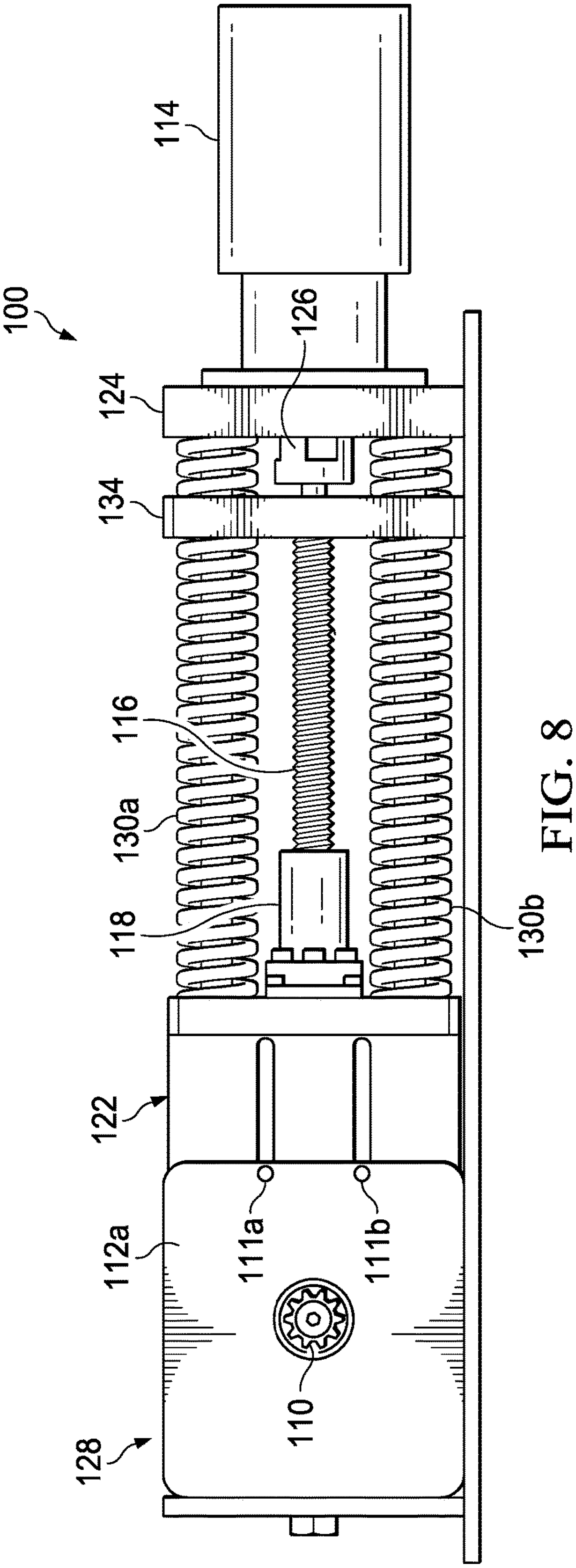
FIG. 8 is a bottom view of the door operator of FIG. 5 in an open-door configuration.

Turning to FIGS. 5-7, door operator 100 is illustrated in a closed-door configuration. In other words, these figures show the internal components of the door operator 100 in a position corresponding to the door being closed. The drive unit 128, as that term is used herein, encompasses the moving parts of the door operator 100 utilized to open the door including, but not necessarily limited to, the ball screw 116, the ball screw nut 118, the yoke 122, the cam assembly 136, and the spindle 110. A number of transverse brackets are mounted to the primary bracket 123 to support the various internal components of the door operator 100. A motor mounting bracket 124 is secured to the primary bracket 123 near one end and an end bracket 125 is secured to primary bracket 123 near the other end. A bearing bracket 134 is disposed between the motor mounting bracket 124 and the end bracket 125. The bearing bracket 134 supports a bearing, such as a ball bearing or other conventional bearing. A number of transverse plates may also be secured to the primary bracket 123, including a first cover plate 112*a* and a second cover plate 112*b*. One or more of the motor mounting bracket 124, the end bracket 125, the bearing bracket 134, the first cover plate 112*a*, and the second cover plate 112*b* may be fastened to the primary bracket 123 using bolts, screws, or any other suitable fastener. One or more of these components may alternatively be welded or otherwise permanently affixed to the primary bracket 123.

A ball screw 116 with a helical channel along a portion of its length extends between the motor 114 at a proximal end and a yoke 122 at a distal end. Details of the yoke 122 are provided in FIG. 9 and the discussion related thereto below. Although the helical channel of a ball screw is typically smooth and rounded as compared to a threaded shaft of a typical bolt or screw, the portion of the ball screw 116 including the helical channel may be referred to herein as "threaded." A coupler 126 is configured to secure a drive shaft of the motor 114 to the proximal end of the ball screw 116. The coupler 126 is illustrated as being positioned between the motor mounting bracket 124 and the bearing bracket 134. However, it should be appreciated that the coupler 126 may be positioned proximally of the motor mounting bracket 124 or distally of the bearing bracket 134 depending on the configuration of the motor 114 being used, particularly the length of its drive shaft. The proximal end of the ball screw 116, to which the coupler 126 is secured, may be unthreaded.

A ball screw nut 118 is secured to the yoke 122, for example by one or more fasteners, and contains one or more balls positioned between the helical channel of the ball screw 116 and an internal surface of the ball screw nut 118. The balls inside the ball screw nut 118 may be steel ball bearings or any suitable similar structure. The ball screw nut 118 may include one or more internal or external return channels to circulate the balls within the ball screw nut 118 during translation of the ball screw nut 118 along the ball screw 116. Ball screw nuts of this type are generally known to those of ordinary skill in the art. Some examples of ball screw nuts are provided in U.S. Pat. Pub. No. 2012/0325036 entitled "Ball Screw and Manufacturing Method of Nut for Ball Screw," U.S. Pat. Pub. No. 2005/0204836 entitled "Seal for Ball Screw and Ball Screw Utilizing Same," and U.S. Pat. No. 3,720,116 entitled "Arrangement for Preloading Ball Screw Assemblies & Method of Manufacture of the Ball Screw Nut Therefor," all of which are incorporated by reference herein in their entireties.

A bearing positioned within the bearing bracket 134 may support an unthreaded proximal portion (or "journal") of the ball screw 116 and keep it positioned in line with the rotation axis of the motor 114, which lies along the longitudinal axis 129 of the door operator 100. In some examples, a portion of the journal or a portion of the shaft of the ball screw 116 proximal of the journal may be threaded to receive a locking nut. The locking nut may be positioned between the coupler 126 and the bearing plate 134 and may prevent the ball screw 116 from being pulled distally toward the yoke 122 and away from the coupler 126 during operation. That is, the locking nut may have an outer diameter greater than a diameter of an opening in the bearing plate 134 through which the ball screw 116 extends. In this regard, in the event that a pulling force is exerted on the ball screw 116 during operation that is sufficiently strong to tend to pull the ball screw 116 out of the coupler 126, the locking nut may contact the bearing plate 134 and prevent such movement.

The distal end of the ball screw 116 is supported and maintained in alignment with the rotation axis by the yoke 122 and/or ball screw nut 118. While illustrated with the rotation axis of the motor drive shaft and ball screw 116 coinciding with the longitudinal axis 129 of the door operator 100, it will be appreciated that the motor 114 and ball screw 116 may be shifted in any direction transverse to the longitudinal axis 129. In this regard, it should be appreciated that, in some examples, the longitudinal axis 129 of the door operator 100 may be defined as intersecting the axis of rotation of the spindle 110 and extending parallel to an axis of translation of the yoke 122.

During rotation of the drive shaft of the motor 114, the coupler 126 causes rotation of the ball screw 116 which rotates within the bearing in the bearing bracket 134 and the ball screw nut 118. Because the motor 114 and ball screw 116 are positionally fixed, this rotation causes movement of the ball screw nut 118 toward the motor 114. Movement of the ball screw nut 118 pulls the yoke 122 in the same direction. The yoke 122 slides longitudinally along two pins 111*a*, 111*b* extending between a first cover plate 112*a* and a second cover plate 112*b*. While the pins 111*a*, 111*b* remained fixed in position by the cover plates 112*a*, 112*b*, the pins slide relative to the yoke 122 within first and second respective slots 149*a*, 149*b*. The pins 111 assist in keeping the yoke 122 positioned along the longitudinal axis 129. Spacer strips 121 may be positioned within the door operator 100 between the first and second cover plates 112*a*, 112*b* and the yoke 122. These spacer strips 121 may be formed from a polymer, a plastic, a metal, or any other suitable material to support the yoke 122 and keep it aligned with the longitudinal axis 129. Four spacer strips 121 are provided in the illustrated example, two on one side of the yoke 122 and two on the other side of the yoke, each of the two spacer strips 121 on one side of the yoke spaced forward and rearward (top and bottom in the illustrated orientation of FIG. 6) across a surface of the yoke. The spacer strips 121 may be fixed to the yoke 122 or to a respective cover plate 112*a*, 112*b*. It will be appreciated that any suitable number of spacer strips, 121, pins 111, and slots 149 may be used without departing from the scope of the present disclosure.

As the yoke 122 translates linearly along the longitudinal axis 129, it pulls on a free end of a cam assembly 136 causing rotation thereof. Details of the cam assembly 136 are provided in FIG. 10 and the discussion related thereto below. An end of the cam assembly 136 opposite the free end is positionally fixed about a rotation axis (axis 156 of FIG. 10) that is approximately transverse to the rotation axis of the motor 114 such that movement of the yoke 122 along the longitudinal axis 129 causes rotation of the cam assembly 136 about rotation axis 156 of the cam assembly. This rotation of the cam assembly 136 drives rotation of the spindle 110 to operate the swing arm assembly 104 as described above.

Two springs 130*a*, 130*b* extend between the motor mounting bracket 124 and the yoke 122. Any number of springs, including less than or more than two springs, may be used without departing from the scope of the present disclosure. The springs 130*a*, 130*b* may each be positioned over a respective rod 132*a*, 132*b*. The rods 132*a*, 132*b* may be secured to the motor mounting bracket 124 at a proximal end. A distal end of each rod 132*a*, 132*b* may be received in and slide within a rod aperture formed in the yoke 122. In this regard, the rods 132*a*, 132*b* may help retain the springs 130*a*, 130*b* in their respective positions. During translation of the yoke 122 caused by the motor 114, the springs 130*a*, 130*b* are compressed between the yoke 122 and the motor mounting bracket 124 as the drive unit 128 transitions from the closed-door configuration shown in FIGS. 5-7 to an open-door configuration shown in FIG. 8. In this open-door configuration of FIG. 8, the yoke 122 as been translated toward the motor 114 (to the right in the illustration) resulting in rotation of the cam assembly 136 and compression of the springs 130*a*, 130*b*. When the motor 114 is powered off, disengaged from the drive unit 128, or otherwise ceases powering the drive unit 128, the potential energy stored in the compressed springs 130*a*, 130*b* is converted into kinetic energy as the springs expand and push the yoke 122 away from the motor 114 which, in turn, rotates the cam assembly 136 and the spindle 110 as the springs return the drive unit 128 back to the closed-door configuration. In an alternative example of a door operator of the present disclosure, the springs 130 may be configured to operate in tension rather than compression. In such an embodiment, a spring 130 may be secured to the yoke 122 at one end and to a cover plate 112*a*, 112*b* or other component distal of the yoke at the other end. In this regard, movement of the yoke 122 toward the motor 114 during operation of the motor increases tension in the spring 130 which can be released upon stopping the motor 114. In the closed-door configuration, the springs 130*a*, 130*b* may be in a neutral (no compression or tension) position or may be in a state of pre-compression or pre-tension to bias the door toward a closed position. It should be appreciated that the springs 130*a*, 130*b* may extend from the yoke 122 only to the bearing bracket 134 or to an additional bracket (not shown) positioned distally of the motor mounting bracket 124.

A directional block 127 may be threadedly engaged with the end bracket 125 to advance or retract with respect thereto. A head of the directional block 127 may be rotated by hand or by a tool (e.g., screwdriver or hex key) inserted into a tool engagement feature (e.g., recess). An end or tip of the directional block 127 opposite the head extends through the end bracket 125 to contact the yoke 122, thereby preventing the yoke from travelling far enough to allow the cam assembly 136 to cross over a longitudinal axis 129 of the door operator 100. The directional block 127 may ensure the direction of operation of the door operator 100 remains consistent with its installation configuration, e.g., left-hand or right-hand operation. In that regard, the directional block 127 prevents the free end of the cam assembly 136 from crossing the longitudinal axis 129 when the drive unit 128 is in the closed-door configuration. To transition the door operator 100 to a different installation configuration, the directional block 127 may be retracted, the cam assembly 136 may be moved to the other side of the yoke 122 (i.e., across the axis 129), and the directional block may be extended back into contact with the yoke 122. The spindle 110 may be moved to an opposing side of the cam assembly 136.

Figure 9:
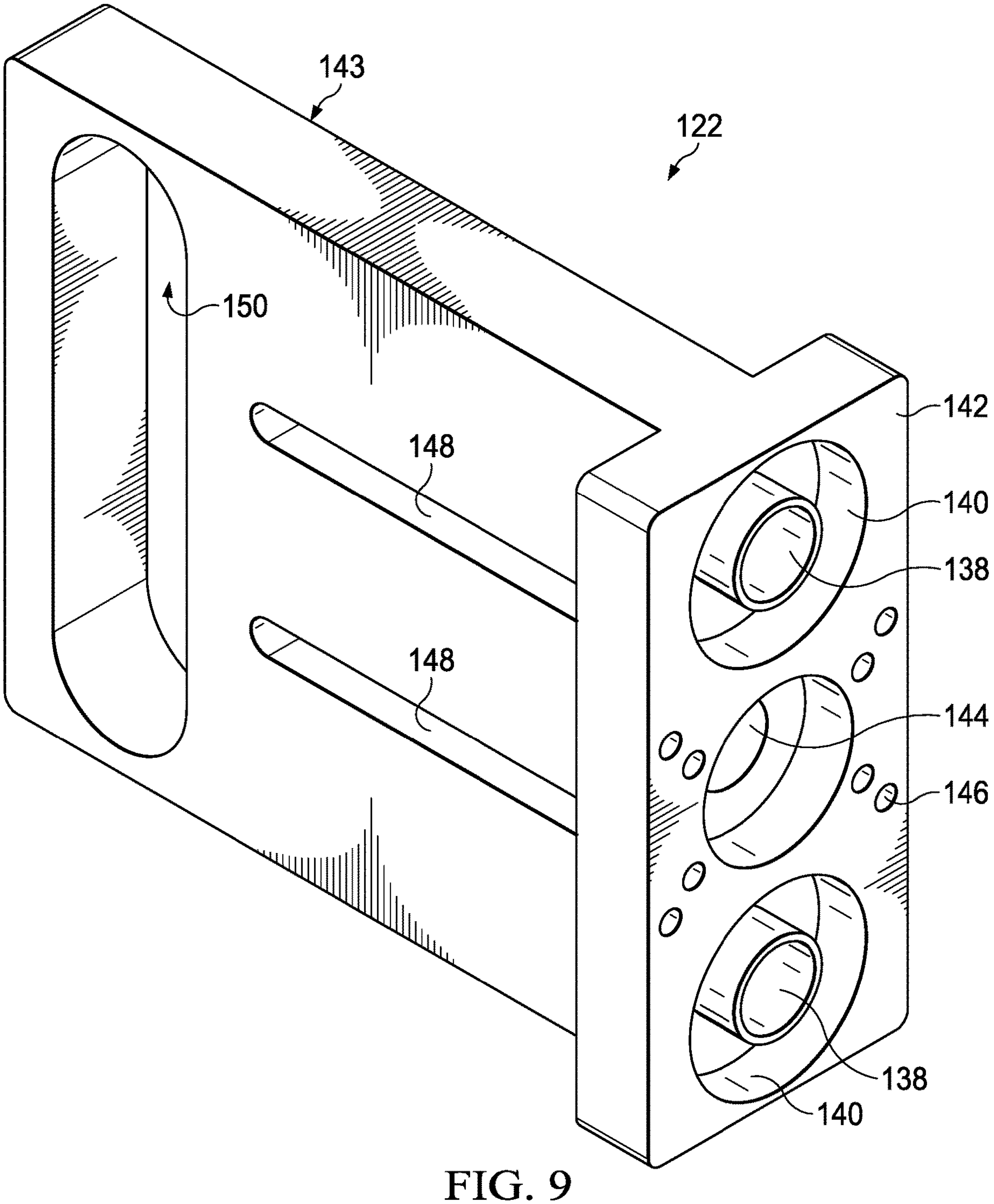
FIG. 9 is a perspective view of a yoke according to an example implementation of a door operator of the present disclosure.

FIG. 9 illustrates an example of a yoke 122 including a yoke body 143 and a flange 142 disposed at one end of the yoke body 143. The flange 142 may be configured to contact the cover plates 112*a*, 112*b* when the drive unit 128 is in the closed-door configuration. The flange 142 may include a ball screw recess 144 and a number of rod recesses 138 to receive a distal end of the ball screw or each rod 132, respectively. The ball screw recess 144 and rod recesses 138 may extend within the yoke body 143 to accommodate the distal end of the ball screw 116 or each rod 132 (which are positionally fixed), respectively, as the yoke 122 slides along the ball screw 116. The flange 142 also includes a number of spring recesses 140 to receive a distal end of each spring 130. Mounting holes 146 are provided around the ball screw recess 144 for securing the ball screw nut 118 to the yoke 122.

Pin slots 148 extend longitudinally along a length of the yoke body 143 to allow the yoke 122 to slide across the pins 111*a*, 111*b* extending between the cover plates 112*a*, 112*b*. A transverse elongated slot 150 is configured to receive a portion of the cam assembly 136. As the yoke 122 translates along the longitudinal axis 129 of the door operator, the cam assembly 136 rolls or slides along a surface of the slot 150 as the cam assembly 136 pivots about its rotation axis.

Figure 10:
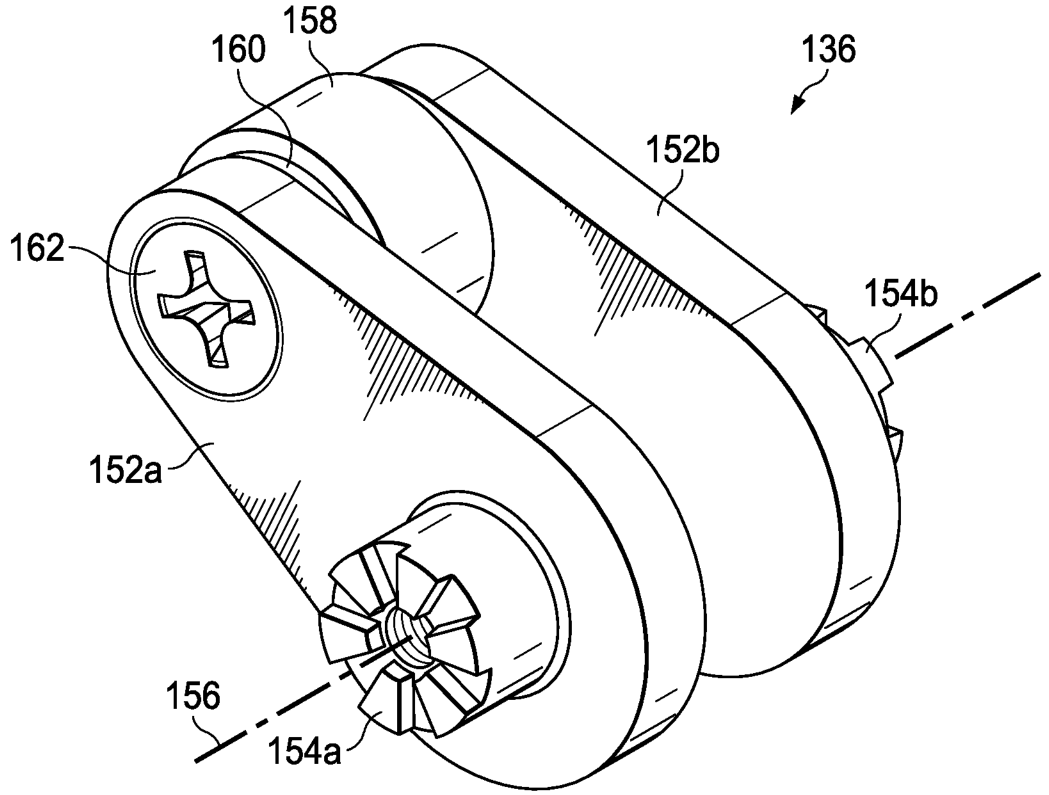
FIG. 10 is a perspective view of a cam assembly according to an example implementation of a door operator of the present disclosure.

FIG. 10 illustrates an example of a cam assembly 136. First and second cam members 152*a*, 152*b* are positioned on opposing sides of a guide member 158. The guide member 158 is configured to engage and ride along the surfaces of the slot 150 of the yoke 122. The guide member 158 may be fixed in relation to the cam members 152*a*, 152*b* or may rotate with respect thereto as the guide member 158 rolls along the slot 150. A spacer 160 may be disposed on either side of the guide member 158 to facilitate rolling of the guide member 158. A fastener 162 may fasten together the components of the cam assembly 136 and provide an axle on which the guide member 158 can roll.

An output shaft extends from each cam member 152*a*, 152*b* on either side of the cam assembly 136. The output shafts 154*a*, 154*b* extend along the rotation axis 156 of the cam assembly 136. The first output shaft 154*a* may be connected to the spindle 110 for use of the door operator 100 in one installation configuration (e.g., left-handed) and the second output shaft 154*b* may be connected to the spindle 110 for use of the door operator 100 in the other installation configuration (e.g., right-handed). Although described as two output shafts, it should be appreciated that the first output shaft 154*a* and the second output shaft 154*b* may be collectively referred to as an output shaft as they are co-linear and rotate about the same axis.

Figure 11:
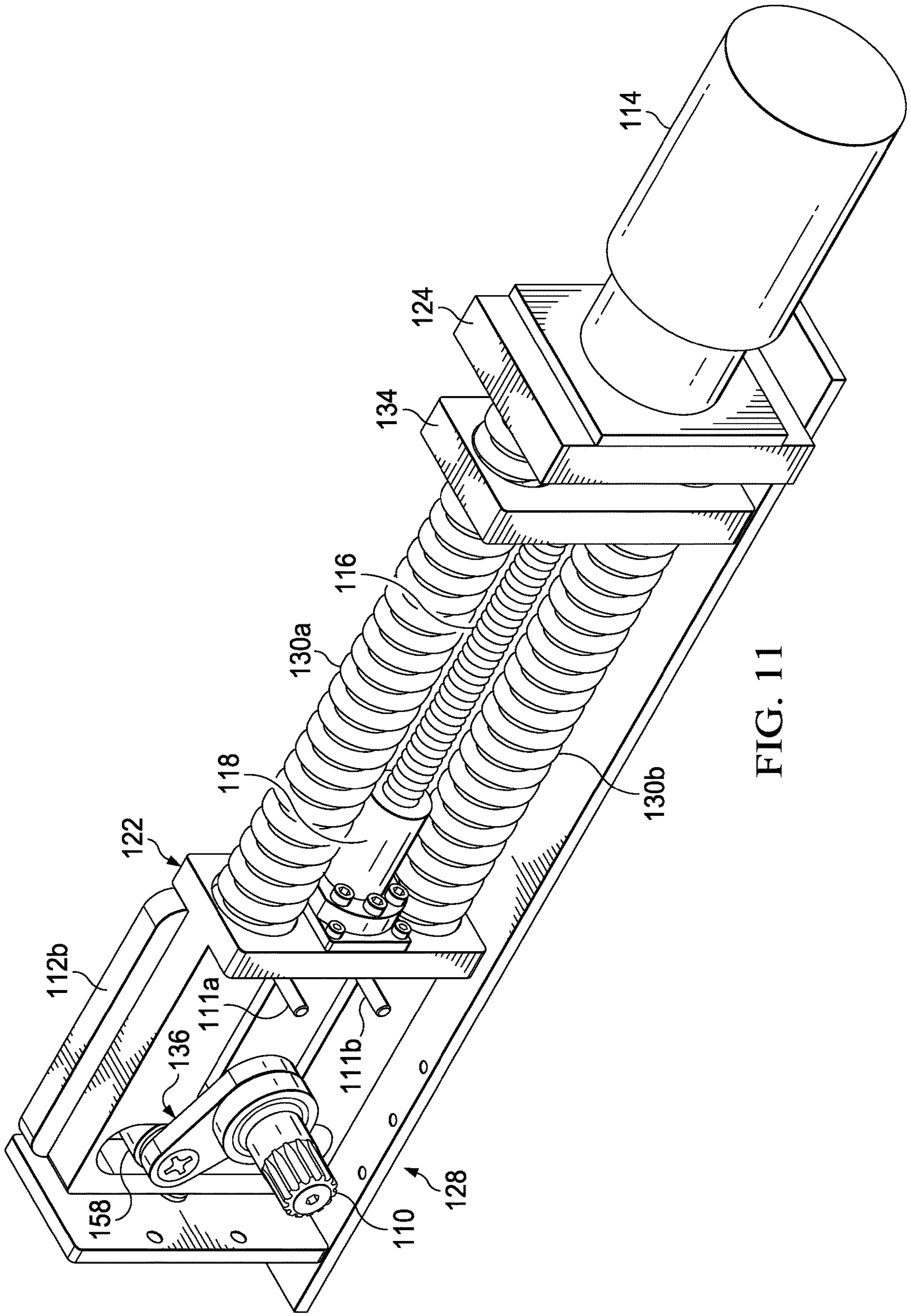
FIG. 11 provides a schematic illustration of an embodiment of a system for opening a door according to an example implementation of the present disclosure.

FIG. 11 provides a perspective view of the door operator 100 with the housing cover 120 and cover plate 112*a* removed to avoid obfuscating the components of the drive unit 128. As will be appreciated by viewing the drive unit in FIG. 11, operating the motor 114 to draw the ball screw nut 118 and yoke 122 toward the motor 114 causes the yoke 122 to pull the guide member 158 of the cam assembly 136. In turn, the cam assembly 136 rotates about the spindle 110.

Figure 12:
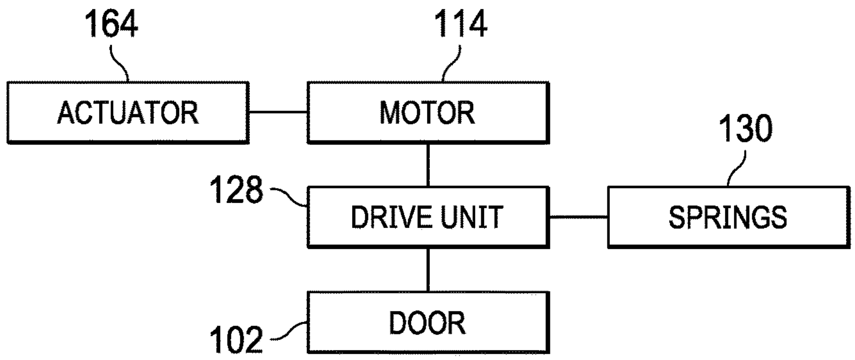
FIG. 12 provides a schematic diagram of an embodiment of a door system according to the present disclosure.

FIG. 12 provides a schematic illustration of an embodiment of a door system according to the present disclosure. Actuator 164 may be any suitable device for initiating operation of a swing door operator. Some examples of contemplated actuators include a motion sensor, pressure-activated pad, camera, door-handle, button, remote control, voice-recognition module, RFID reader, keypad, etc. Actuator 164 may transmit an open instruction to a controller associated with motor 114, thereby causing motor 114 to operate to power the drive unit 128. The drive unit 128 is operatively connected to both one or more springs 130 and a door 102. As the drive unit 128 opens the door via powered operation of the motor 114, the drive unit 128 also compresses the springs 130. When the controller instructs the motor 114 to shut-off or disengage from the drive unit 128, the springs 130 expand. Expansion of the springs 130 operates the drive unit 128 in reverse operating mode to swing the door 102 closed.

Figure 13:
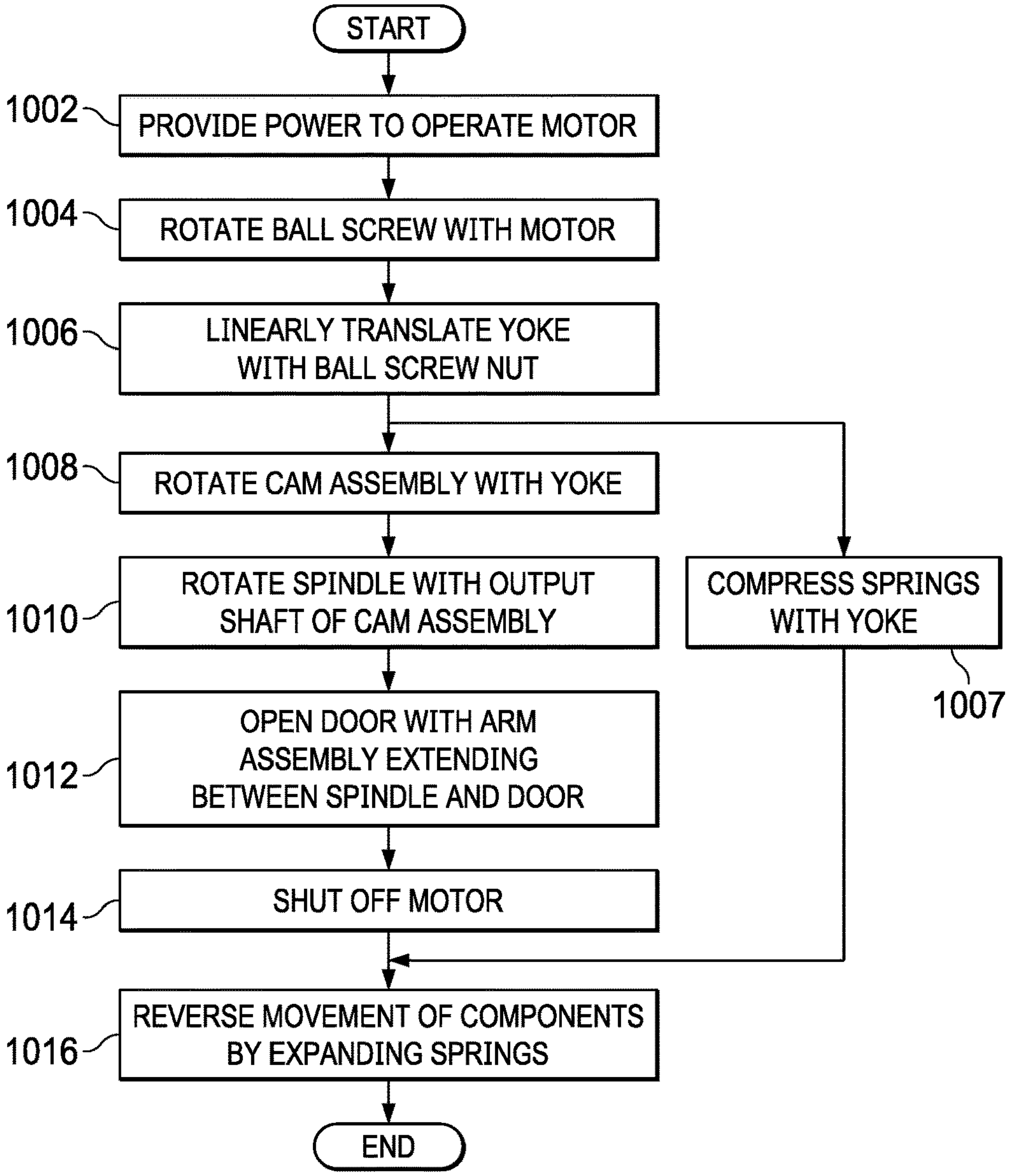
FIG. 13 is a flowchart of a method for operating a door operator according to an example implementation of the present disclosure.

FIG. 13 provides a flowchart of a method 1000 for operating a door operator such as the door operator 100 in accordance with the present disclosure. At process 1002, power is provided to the motor causing the motor to rotation the driveshaft. Power may be selectively applied to the motor by a controller. The controller may be in operative communication with an actuator or sensor configured to trigger operation of the door operator. At process 1004, the ball screw is rotated by the motor. The ball screw may be a portion of the drive shaft of the motor or may be coupled thereto. At process 1006, a yoke is translated linearly along the ball screw using a ball screw nut secured to the yoke. In some examples, the ball screw nut may be an integral part of the yoke. During translation of the yoke, one or more springs may be compressed between the moving yoke and a stationary part of the door operator. At process 1008, a cam assembly is rotated by the yoke about an axis of the cam assembly. At process 1010, rotation of the cam assembly causes rotation of a spindle using an output shaft of the cam assembly. In some examples, the spindle may be an integral part of the cam assembly. At process 1012, a door is opened using an arm assembly extending between the spindle and the door. At process 1014, the motor is shut off by stopping the provision of power to the motor. This may be performed by the controller in response to a timer, a door limit sensor, or a position sensor within the door operator (e.g., a rotary encoder tracking a position of the ball screw or motor drive shaft). At process 1016, the springs may be allowed to expand, releasing the compression and moving the yoke back to its initial position, thereby reversing the movement of the various components caused by operation of the motor.

Persons of ordinary skill in the art will appreciate that the implementations encompassed by the present disclosure are not limited to the particular exemplary implementations described above. In that regard, although illustrative implementations have been shown and described, a wide range of modification, change, combination, and substitution is contemplated in the foregoing disclosure. For example, a number of processes of the method 1000 may be omitted without departing from the scope of the present disclosure. It is understood that such variations may be made to the foregoing without departing from the scope of the present disclosure. Accordingly, it is appropriate that the appended claims be construed broadly and in a manner consistent with the present disclosure.

What is claimed is:

1. A door operator, comprising:
an output shaft configured to be coupled to a door;
a ball screw;
a powered driver operatively coupled to the ball screw and configured to rotate the ball screw in a first rotational direction; and
a yoke coupled to the ball screw and configured to translate in response to rotation of the ball screw, the yoke configured to rotate the output shaft,
wherein the door operator has:
a first installation configuration in which operation of the powered driver to rotate the ball screw in the first rotational direction causes rotation of the output shaft in a first output shaft rotational direction; and
a second installation configuration in which operation of the powered driver to rotate the ball screw in the first rotational direction causes rotation of the output shaft in a second output shaft rotational direction opposite the first output shaft rotational direction.

2. The door operator of claim 1, further comprising a cam assembly coupled to the yoke, the cam assembly configured to rotate about a rotation axis of the output shaft during translation of the yoke, wherein the rotation axis of the output shaft is substantially transverse to a rotation axis of the ball screw.

3. The door operator of claim 2, wherein the yoke comprises an elongated slot having a longitudinal axis oriented transverse to the rotation axis of the ball screw, the cam assembly extending into the elongated slot.

4. The door operator of claim 3, wherein the cam assembly comprises a guide member configured to roll along a surface defining the elongated slot during translation of the yoke.

5. The door operator of claim 1, further comprising:
at least one spring configured to rotate the ball screw in a second rotational direction opposite the first rotational direction.

6. The door operator of claim 5, further comprising:
a ball screw nut disposed about the ball screw and coupled to the yoke, the ball screw nut configured to pull the yoke in a first linear direction when the ball screw is rotated in the first rotational direction and to push the yoke in a second linear direction when the ball screw is rotated in the second rotational direction.

7. The door operator of claim 5, wherein the yoke is configured to compress the spring as the yoke translates in response to rotation of the ball screw in the first rotational direction, and wherein the spring is configured to expand and push the yoke causing rotation of the ball screw in the second rotational direction.

8. A system, comprising:
a door; and
the door operator of claim 1.

9. The system of claim 8, wherein the door operator further comprises:
at least one spring configured to rotate the ball screw in a second rotational direction opposite the first rotational direction.

10. The system of claim 9, further comprising:
a swing arm coupling the door operator and the door.

11. The system of claim 10, further comprising:

a frame hingedly coupled to the door and supporting the door operator.

12. The system of claim 11, further comprising:

a track mounted to the door and slidably supporting an end of the swing arm; or a bracket mounted to the door and pivotally supporting an end of the swing arm.

13. The system of claim 12, further comprising:

an actuator configured to trigger actuation of the powered driver.

14. A door operator, comprising:

an output shaft configured to be coupled to a door;

a ball screw;

a powered driver operatively coupled to the ball screw and configured to rotate the ball screw in a first rotational direction;

a yoke coupled to the ball screw and configured to translate in response to rotation of the ball screw, the yoke configured to rotate the output shaft and having an elongated slot;

a cam assembly coupled to the yoke and comprising a guide member extending through the elongated slot; and a directional block configured to prevent the guide member from crossing a longitudinal axis of the door operator.

15. A door operator, comprising:

an output shaft configured to be coupled to a door;

a ball screw;

a powered driver operatively coupled to the ball screw and configured to rotate the ball screw in a first rotational direction;

a yoke coupled to the ball screw and configured to translate in response to rotation of the ball screw, the yoke configured to rotate the output shaft; and at least one pin oriented transverse to a longitudinal axis of the ball screw, the at least one pin configured to extend through at least one slot in the yoke, the at least one slot oriented parallel to the longitudinal axis of the ball screw.

16. A door operator, comprising:

an output shaft configured to be coupled to a door;

a ball screw;

a powered driver operatively coupled to the ball screw and configured to rotate the ball screw in a first rotational direction;

a yoke coupled to the ball screw and configured to translate in response to rotation of the ball screw, the yoke configured to rotate the output shaft;

a spring configured to rotate the ball screw in a second rotational direction opposite the first rotational direction; and a rod extending longitudinally within the spring, wherein the yoke comprises at least one rod recess configured to receive an end of the rod as the yoke is translated.

17. A method for operating a door operator, comprising:

rotating a ball screw in a first rotational direction with a powered driver operatively coupled to the ball screw;

translating a yoke coupled to the ball screw using the rotation of the ball screw; and rotating an output shaft using the translation of the yoke, the output shaft couplable to a door, wherein the door operator has:

a first installation configuration in which operation of the powered driver to rotate the ball screw in the first rotational direction causes rotation of the output shaft in a first output shaft rotational direction; and a second installation configuration in which operation of the powered driver to rotate the ball screw in the first rotational direction causes rotation of the output shaft in a second output shaft rotational direction opposite the first output shaft rotational direction.

18. The method of claim 17, further comprising:

compressing, during the translation of the yoke, the at least one spring; and rotating the ball screw in a second rotational direction, opposite the first rotational direction, by expanding the at least one spring.

19. The method of claim 17, wherein rotating the output shaft using the translation of the yoke comprises rotating a cam assembly engaged with the yoke, the cam assembly including the output shaft.

* * * * *